United States Patent
Kobayashi (10) Patent No.: US 7,903,026 B2
(45) Date of Patent: Mar. 8, 2011

(54) POSITIONING APPARATUS AND POSITIONING APPARATUS CONTROL METHOD

(75) Inventor: Yosuke Kobayashi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 162 days.

(21) Appl. No.: 12/120,802

(22) Filed: May 15, 2008

(65) Prior Publication Data

US 2009/0079626 A1 Mar. 26, 2009

(30) Foreign Application Priority Data

May 21, 2007 (JP) ................................ 2007-134516

(51) Int. Cl.
*G01S 19/32* (2010.01)
*G01S 19/34* (2010.01)
*G01S 19/36* (2010.01)
*G01S 19/37* (2010.01)

(52) U.S. Cl. .......... 342/357.72; 342/357.74; 342/357.76; 342/357.77

(58) Field of Classification Search ............ 342/357.15, 342/357.02, 357.12, 357.13, 357.63, 357.72, 342/357.74, 357.76, 357.77
See application file for complete search history.

(56) References Cited

U.S. PATENT DOCUMENTS

| 5,248,981 | A |   | 9/1993 | Yoshihara et al. |
| 5,678,169 | A | * | 10/1997 | Turney ............................. 455/1 |
| 5,883,597 | A | * | 3/1999 | DeWulf ................... 342/357.12 |
| 6,600,909 | B1 |   | 7/2003 | Nikulin et al. |
| 6,639,541 | B1 | * | 10/2003 | Quintana et al. ................ 342/18 |
| 6,967,992 | B1 | * | 11/2005 | Rabaeijs et al. .............. 375/150 |
| 7,525,481 | B2 | * | 4/2009 | Leinonen et al. ........ 342/357.12 |
| 2002/0049534 | A1 |   | 4/2002 | Yuda et al. |
| 2007/0167168 | A1 |   | 7/2007 | Fukamachi et al. |
| 2007/0250868 | A1 |   | 10/2007 | Konno et al. |
| 2008/0123718 | A1 |   | 5/2008 | Kobayashi |

FOREIGN PATENT DOCUMENTS

JP  2006-258436  9/2006

OTHER PUBLICATIONS

English language Abstract of JP 2006-258436, Sep. 28, 2006.

* cited by examiner

*Primary Examiner* — Thomas H Tarcza
*Assistant Examiner* — Cassi Galt
(74) *Attorney, Agent, or Firm* — Greenblum & Bernstein, P.L.C.

(57) ABSTRACT

The positioning apparatus and position apparatus control method are able to efficiently receive useful signals without special circuitry. Positioning apparatus 100 has first signal processing section 121 that carries out demodulation processing on the first signal transmitted from a satellite and second signal processing section 122 that carries out demodulation processing on the second signal of a different frequency band and spreading scheme from the first signal, and controlling section 104 controls the operation for the signal of the lower electric field intensity based on operations for the signal of the higher electric field intensity between first signal processing section 121 and second signal processing section 122, and carries out control to preferentially operate the channel for the signal of the higher electric field intensity between first signal processing section 121 and second signal processing section 122 and to preferentially stop the operation of the channels for the signal of the lower electric field intensity.

11 Claims, 6 Drawing Sheets

(a) CODE CORRELATION CHARACTERISTICS UPON
RECEPTION OF MULTIPATH (IN-PHASE)

(b) CODE CORRELATION CHARACTERISTICS UPON
RECEPTION OF MULTIPATH (ROUT-OF-PHASE-PHASE)

POSITIONING APPARATUS AND POSITIONING APPARATUS CONTROL METHOD

CROSS REFERENCE TO RELATED APPLICATIONS

The disclosure of Japanese Patent Application No. 2007-134516, filed on May 21, 2007, including the specification, drawings and abstract, is incorporated herein by reference in its entirety.

BACKGROUND OF THE INVENTION

1. Field of the Invention

The present invention relates to a positioning apparatus and a positioning apparatus control method utilizing the GNSS (Global Navigation Satellite System) satellite. More particularly, the present invention relates to a GPS utilizing positioning apparatus for finding position and speed by GPS (Global Positioning System) satellites that orbit around the earth.

2. Description of Related Art

Positioning apparatuses utilizing the global navigation satellite system (GNSS) that utilizes satellites such as the GPS system run by the United States of America or GLONASS (Global Navigation Satellite System) run by Russia conventionally, calculate absolute position on the earth by receiving radio waves from a plurality of GNSS satellites at the same time and obtaining navigation messages from the GNSS satellites (orbit information and time information).

A positioning apparatus utilizing satellites usually receives four or more signals from a satellite at the same time, tracks the spreading codes by capturing the carriers, carries out spectrum despreading processing and demodulates navigation data from the satellite signals. Further, the positioning apparatus calculates the time the satellites transmitted the signals, using the navigation data and the like, finds the pseudo range of each satellite (the time the satellite signal takes to reach a positioning apparatus) and determines position of the positioning apparatus based on the determined pseudo range.

Currently, GPS receivers are widely used in various fields, such as, car navigation systems, mobile phones, airplane control and measurement of diastrophism. However, accompanying the expansion of applicable fields, it becomes more difficult for the GPS alone to satisfy required performance of the accuracy and reliability in positioning. As part of the GPS development policy, the United States of America running the GPS plans to improve the accuracy and reliability in positioning by introducing new public signals to different frequency bands in addition to the L1 band which is the existing public frequency band.

Navigation data of 50 bps showing time and position is transmitted to the ground on a signal of the existing L1 band subjected to BPSK modulation by the spreading code referred to as "C/A code (Coarse/Acquisition Code)" of 1 msec period at the carrier frequency of 1.575 GHz, the coding rate of 1.023 Mbps and the code length of 1023 chips. Two bands, the L2 band and L5 band, are planned as the new frequency bands. In the L2 band, navigation data of 25 bps is subjected to time division BPSK modulation by two spreading codes of L2CM code with code length of 10230 chips and L2CL code with the code length of 767250 chips at the carrier frequency of 1.227 GHz and the code rating of 1.023 Mbps. Therefore, the periods of codes are 20 msec and 1.5 sec, respectively. Further, in the L5 band, navigation data is subjected to QPSK modulation by the spreading code of I5/Q5 code with the code length of 10230 chips and 1 msec period at the carrier frequency of 1.176 MHz and the coding rate of 10.23 Mbps.

Patent Document 1 (Japanese Patent Application Laid-Open No. 2006-258436) discloses a satellite navigation apparatus that, in a positioning apparatus utilizing L1C/A code, L2CM code, L2CL code, L5I5 code and L5Q5 code transmitted from GPS satellites, when search is repeated upon asynchrony, carries out frequency scanning in parallel to code scanning with respect to a plurality of satellite signals, which are subjected to spectrum spreading according to different modulation codes and which are transmitted from one satellite, and captures again the carrier frequency and code phase based on the level of an added correlation value obtained by adding correlation values at a correlation detecting section.

Further, Europe plans the Galileo system for constructing a satellite positioning system using the same number of satellites as in the GPS. A plurality of frequency signals are prepared for this Galileo system, and, if a plurality of these signals can be utilized, it is possible to realize performance more than conventional one (a wider range of a receiving area and improvement of the accuracy in positioning a positioning apparatus).

However, a conventional positioning apparatus as described above increases available signals, and, so, requires signal processing circuits for the L2 band and the L5 band as the same number of channels as channels held in a current signal processing circuit for the L1 band and so there is a problem that power consumption increases accompanying the increase in the circuit scale.

Further, a plurality of signals transmitted by satellites are transmitted with different transmission power, and, compared to the L5 band utilized by the GPS, transmission power is about −2 dB in the L1 band and about −6 dB in the L2 band, and so there is a problem that it is difficult for a positioning apparatus to receive signals with little transmission power.

SUMMARY OF THE INVENTION

It is therefore an object of the present invention to provide a positioning apparatus and a positioning apparatus control method for efficiently receiving useful signals without special circuitry.

According to an aspect of the present invention, the positioning apparatus with a plurality of channels for scanning or tracking satellite signals, includes: a first signal processing section that carries out demodulation processing on a first signal transmitted from a satellite; a second signal processing section that carries out demodulation processing on a second signal of a different frequency band or spreading scheme from the first signal; a positioning section that calculates a distance from the positioning apparatus to the satellite based on results of the demodulation processings on the first signal and the second signal and carries out positioning arithmetic operation; an electric field intensity comparing section that measures an electric field intensity difference between the first signal and the second signal transmitted from the same satellite, based on the results of the demodulation processings in the first signal processing section and the second signal processing section; an electric field intensity storing section that stores the electric field intensity difference; and a controlling section that controls operations of channels in the first signal processing section and channels in the second signal processing section, based on electric field intensity information of the electric field intensity storing section, wherein, between the first signal processing section and the second signal processing section, the controlling section controls an operation for a signal of a lower electric field intensity based on operations for a signal for a higher electric field intensity.

According to another aspect of the present invention, a control method of a positioning apparatus with a plurality of channels for scanning or tracking satellite signals, includes; a first signal processing step of carrying out demodulation processing on a first signal transmitted from a satellite; a second signal processing step of carrying out demodulation processing on a second signal of a different frequency band or spreading scheme from the first signal; a positioning step of calculating a distance from the positioning apparatus to the satellite based on results of the demodulation processings on the first signal and the second signal and carrying out positioning arithmetic operation; an electric field intensity comparing step of measuring an electric field intensity difference between the first signal and the second signal transmitted from the same satellite, based on the results of the demodulation processings in the first signal processing step and the second signal processing step; an electric field intensity storing step of storing the electric field intensity difference; and a controlling step of controlling operations of channels in the first signal processing step and channels in the second signal processing step, based on information of the stored electric field intensity difference.

DETAILED DESCRIPTION OF THE PREFERRED EMBODIMENT

An embodiment of the present invention will be described in detail below with reference to the accompanying drawings.

Embodiment

Figure 1:
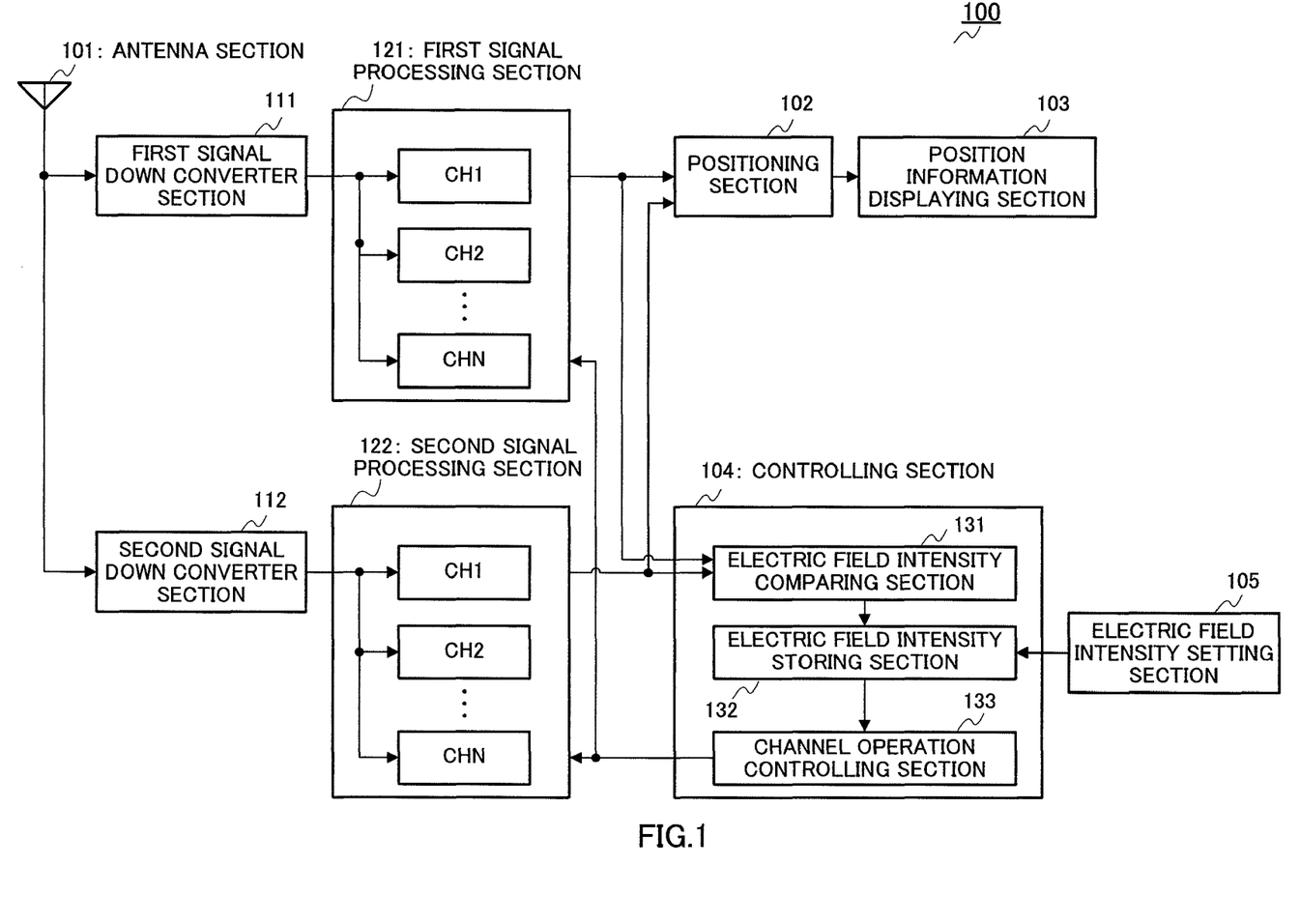
FIG. 1 is a function block diagram showing a configuration of a positioning apparatus according to an embodiment of the present invention.

FIG. 1 is a function block diagram showing a configuration of a positioning apparatus according to an embodiment of the present invention. The present embodiment is an example of applying the present invention as a positioning system to a satellite positioning system supporting the GPS.

In FIG. 1, positioning apparatus 100 with a plurality of channels for scanning or tracking satellite signals, has: antenna section 101 for receiving satellite signals; first signal down converter section 111 that down-converts signals received at antenna section 101 to first intermediate frequency signals; second signal down converter section 112 that down-converts signals received at antenna section 101 to second intermediate frequency signals; first signal processing section 121 that carries out signal processing on the first intermediate frequency signals and carries out demodulation processing on the first intermediate frequency signals subjected to spectrum spreading; second signal processing section 122 that carries out signal processing on the second intermediate frequency signals and carries out demodulation processing on the second intermediate frequency signals subjected to spectrum spreading; positioning section 102 that carries out positioning arithmetic operation; position information displaying section 103 that displays a positioning result; controlling section 104 that controls first signal processing section 121 and second signal processing section 122; and electric field intensity setting section 105.

Antenna section 101 receives a radio wave from a satellite.

First signal down converter section 111 carries out down-conversion and analogue-to-digital conversion (A/D conversion) on a satellite signal received at antenna section 101 into the first intermediate frequency signal, and outputs this first intermediate frequency signal to channels CH1, CH2, . . . , in first signal processing section 121. Second signal down converter section 112 carries out down-conversion and A/D conversion on a satellite signal received at antenna section 101 into a second intermediate frequency signal, and outputs this second intermediate frequency signal to channels CH1, CH2, . . . , in second signal processing section 122. The configuration of the above channels will be described later in detail with reference to FIG. 2.

First signal processing section 121 carries out demodulation processing on the first signal transmitted from a satellite. The first signal is, for example, the L1 signal.

Second signal processing section 122 carries out demodulation processing on the second signal of a different frequency band or spreading scheme from the first signal. If the first signal is the L1 signal, the second signal has a different frequency band or spreading scheme from the first signal (the L1 signal), for example, the L2 signal or the L5 signal.

The satellite signals processed by first signal processing section 121 and second signal processing section 122 include at least two of the L1 band signal, the L2 band signal and the L5 band signal transmitted from the GPS satellite.

Positioning section 102 calculates the distance between the satellite and the positioning apparatus based on the results of demodulation processing on the first signal and the second signal, and carries out positioning arithmetic operation.

Control section 104 is formed with microprocessors and the like, and carries out the basic control of positioning apparatus 100, including selection of satellites for scanning, tracking control of received signals and acquisition of navigation messages transmitted from satellites. Between first signal processing section 121 and second signal processing section 122, control section 104 controls the operation of the channels for the signal of the lower electric field intensity based on the operation for the signal of the higher electric field intensity. Further, between first signal processing section 121 and second signal processing section 122, controlling section 104 preferentially operates the channels for the signal of the higher electric field intensity and preferentially stops the operation of the channels for the signal of the lower electric field intensity.

Controlling section 104 has electric field intensity comparing section 131 that compares with respect to the same satellite the electric field intensity calculated based on the code correlation intensity determined in first signal processing section 121 and the electric field intensity calculated based on the code correlation intensity determined in second signal processing section 122, electric field intensity storing section 132 that stores comparison results and channel operation controlling section 133 that controls operations of channels in first signal processing section 121 and second signal processing section 122 based on electric field intensity information from electric field intensity storing section 132. Code correlation will be described later with reference to FIG. 3.

Electric field intensity comparing section 131 measures the electric field intensity difference between the first signal and the second signal transmitted from the same satellite based on the demodulation results in first signal processing section 121 and second signal processing section 122.

Electric field intensity storing section 132 stores the electric field intensity difference. If the electric field intensities of the first signal and the second signal transmitted from the same satellite are equal to or more than a predetermined value, electric field intensity storing section 132 stores the electric field intensity difference. Electric field intensity storing section 132 calculates the difference between the amounts of signal attenuation in signal transmission of the first signal and the second signal transmitted from the same satellite using the distance calculated by positioning section 102 between the satellite and the positioning apparatus, adds the electric field intensity difference obtained at electric field intensity comparing section 131 to the difference between the amounts of signal attenuation, and stores the result. Electric field intensity storing section 132 has a function for setting the electric field intensity difference from remote apparatus.

Channel operation controlling section 133 controls the operations of channels in first signal processing section 121 and second signal processing section 122 based on electric field intensity information from electric field intensity storing section 132. Channel operation controlling section 133 holds the minimum electric field intensity value to enable reception at the positioning apparatus, and, if the electric field intensity in the channels for the signal of the higher electric field intensity is equal to or more than a predetermined value, operates the channels for the signal of the lower electric field intensity. Channel operation controlling section 133 has functions of demodulating the first signal and the second signal transmitted from the same satellite, and, when one of the signals is demodulated and the electric field intensity is measured, changing the integration period for the other signal that is not yet demodulated. If one of the first signal and the second signal transmitted from the same satellite cannot be demodulated even after a certain time passes, channel operation controlling section 133 decides that the demodulated signal includes the jamming signal and resets the signal processing operation. If the electric field intensity difference between the first signal and the second signal is different from the value of electric field storing section 132, channel operation controlling section 133 carries out control such that this satellite is not used in positioning arithmetic operation.

Figure 2:
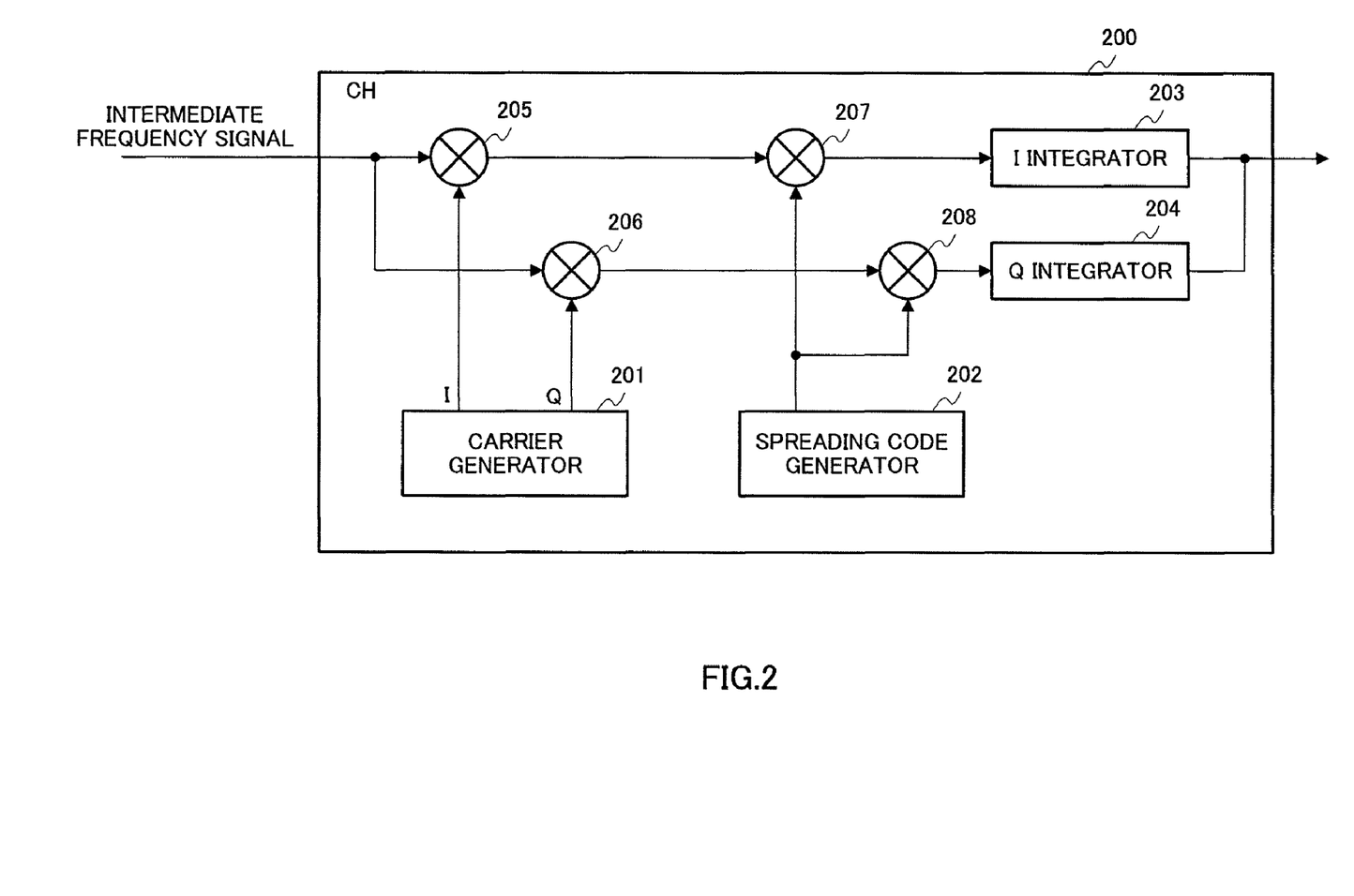
FIG. 2 is a function block diagram showing a configuration of each channel of the first signal down converter section and the second signal down converter section of the positioning apparatus according to the present embodiment.

FIG. 2 is a function block diagram showing a configuration of channels, CH1, CH2, . . . , of above first signal down converter section 111 and second signal down converter section 112. Channels CH1, CH2, . . . employ the same configuration and will be referred to as "channel CH200."

In FIG. 2, channel CH200 is formed with carrier generator 201, spreading code generator 202, I integrator 203, Q integrator 204 and multipliers 205 to 208.

Carrier generator 201 generates a predetermined frequency signal, multiplies this signal by the first or second intermediate frequency signal inputted from first signal down converter section 111 or second signal down converter section 112 and removes the carrier component included in the intermediate frequency signal.

Spreading code generator 202 generates a predetermined spreading code for capturing the satellite, multiplies by the spreading code the intermediate frequency signal from which the carrier component is removed, and finds the correlation between the multiplication result and the spreading code signal from the satellite. For this reason, spreading code generator 202 is formed with a predetermined number of shift registers determined according to the types of spreading codes, and the spreading code of the target satellite is generated by setting a value determined as a satellite-specific-value as the default value of the shift registers and applying the clock to the shift registers.

I integrator 203 and Q integrator 204 carry out time integration in a predetermined period with respect to the I-phase of an intermediate frequency signal and the Q-phase of a phase 90 degrees shifted with respect to the I-phase.

Here, the spreading codes are satellite specific codes and include the above C/A code, L2CM code, L2CL code, I5 code and Q5 code. To capture a spreading code of a satellite, controlling section 104 first selects a target satellite, and spreading code generator 202 generates the same spreading code as the spreading code of the target satellite. Then, correlation processing is carried out by multiplying the generated spreading code by the spreading code of the satellite signal, and the phases of both spreading codes are controlled to match. Further, to match phases, these spreading codes produce the maximum correlation value when their phases match and produce zero correlation when their phases do not match, and so correlation processing is carried out by shifting phases generated at spreading code generator 202 by a predetermined amount and this processing is repeated until the integral values calculated in I integrator 203 and Q integrator 204 are maximum, that is, until the spreading code of the target satellite is captured.

The operation of positioning apparatus 100 configured as described above will be described later.

In positioning apparatus 100 of the present embodiment, controlling section 104 has electric field intensity comparing section 131 that compares with respect to the same satellite the electric field intensity calculated based on the code correlation intensity determined in first signal processing section 121 and the electric field intensity calculated based on the code correlation intensity determined in second signal processing section 122, electric field intensity storing section 132 that stores comparison results and channel operation controlling section 133 that controls the operations of the channels in first signal processing section 121 and second signal processing section 122 based on electric field intensity information from electric field intensity storing section 132, and executes (1) power consumption reduction control, (2) default value control, (3) position correction control, (4) multipath cancellation control and (5) jamming signal cancellation control.

(1) Power Consumption Reduction Control

Transmission power intensity varies between L1, L2 and L5. L5 has the greatest transmission power, followed by L1 and L2. Further, relative differences between power levels of L5, L1 and L2 are known. L5 has the greatest power, and so, if the received power of L5 is lower than a predetermined value, it naturally follows that received power of L1 and L2 are lower and positioning or reception is not possible. Further, if the electric field intensity of L5 keeps a certain level, it is possible to estimate whether or not other signals are received based on the level of L5, for example, L1 and L2 can be received, or L1 can be received but L2 cannot be received.

Other than special cases where satellites are out of order, generally, if reception is not possible in L5, reception is not possible in L1 and L2. With the present embodiment, if the received power of L5 is lower than a predetermined value, assume that reception is not possible in L1 and L2, power supply for receiving circuits of L1 and L2 is stopped. Stopping power supply means, for example, stopping supplying clock. Although electricity can be turned off in circuit block units, it is preferable to stop supplying clock taking into account reduction in the next start-up time. Stopping clock supply also includes delaying clock supply or reducing the clock frequency. Further, if a condition where received power of L5 is lower than a predetermined value continues for a predetermined time or more, an embodiment of turning off circuit electricity may be possible.

By this means, if the received power of L5 is lower than a predetermined value, it is possible to reduce power consumption by stopping the receiving circuits for L1 and L2 without operating receiving circuits of L1 and L2.

By the way, L5 is not introduced only to realize this power consumption reduction control. Accuracy improves if two frequency bands are used. The reason is that a delay error occurs in the space and atmosphere between the GPS satellite and the receiver. This error is comparatively significant and needs to be corrected. The carrier frequencies of L1 and L2 are different, and so a shift can be calculated according to a predetermined arithmetic operation. The error can be corrected based on the difference between L1 and L2. Therefore, using a plurality of frequency bands improves accuracy. Furthermore, the GPS used in the car navigation system is a code type and carries out positioning using PRN codes. By contrast with this, there is a method of carrying out positioning using the carrier frequency, and, according to this method, communication quality improves if the number of frequencies for use is greater. L5 is not used only for this power consumption reduction control. But L5 is originally introduced for, for example, improved accuracy, and is used in an expanded manner of use. In this case, the number of parts for L5 does not increase and it is possible to provide an effect of reducing power consumption.

(2) Default Value Control

Although transmission power of above L1, L2 and L5 have been described as fixed values, in practice, transmission power may vary per satellite and per generation. The relative differences between the power levels of L1, L2 and L5 change. Therefore, if fixed values are set as default values for the receiving apparatus, the specifications of the receiving apparatus need to be changed every time a satellite or generation changes. With the present embodiment, power differences between L1, L2 and L5 are calculated on a regular basis, and, if these differences change, default value control is carried out to change the default value.

(3) Position Correction Control

For the relative differences between above L1, L2 and L5, the amount of power attenuation changes according to position of the receiving apparatus, that is, according to the distance between the satellite and the receiving apparatus. Correcting the position of this receiving apparatus is referred to as "position correction control." Position correction control is carried out to improve the accuracy in above (2) default value control.

(4) Multipath Signal Cancellation Control

With the present embodiment, whether or not multipath signals are received is decided, and, if multipath signals are received from a satellite, multipath cancellation control is carried out to drop this satellite from the target of positioning arithmetic operation. By this means, it is possible to prevent deterioration of the accuracy in positioning due to multipath.

(5) Jamming Signal Cancellation Control

Similarly, with the present embodiment, whether or not a jamming signal is received is decided, and, if the jamming signal is received, resets the signal processing operation and carries out jamming signal cancellation control to scan the right signal which is not a jamming signal. By this means, it is possible to efficiently receive useful signals.

[Overall Operation of Positioning Apparatus 100]

Antenna section 101 receives a satellite signal, and first signal down converter section 111 and second signal down converter section 112 carry out down-conversion and A/D conversion on the satellite signals into the first intermediate frequency signal and second intermediate frequency signal, respectively. Satellite signals that can be used for positioning include the L1 band for carrying out spectrum spreading according to C/A code of the GPS, the L2 band for carrying out spectrum spreading according to L2CM code and L2CL code and the L5 band for carrying out spectrum spreading according to I5/Q5 code, and assume that different frequency bands are selected for the first signal and the second signal.

First signal processing section 121 and second signal processing section 122 carry out signal processing on the first intermediate frequency signal and the second intermediate frequency signal, respectively, and obtain navigation messages and time information transmitted from the satellite.

In first signal processing section 121 and second signal processing section 122, carrier generator 201 generates a regenerated carrier and spreading code generators 202 generates a pseudo noise code unique to the satellite of the receiving target. The frequency of the regenerated carrier is determined to match the carrier frequency of the satellite signal. Code correlation is determined by mixing this pseudo noise code with the intermediate frequency signal, carrying out a frequency conversion using the regenerated carrier and then carrying out a time integration in I integrator 203 and Q integrator 204. Code correlation will be described later with reference to FIG. 3. By controlling the pseudo noise code timing such that this code correlation is maximum, the pseudo noise code of the satellite signal is tracked, navigation data broadcasted by the satellite with the tracked pseudo noise code is received and signal transmission time information of the satellite is determined.

Positioning section 102 carries out positioning arithmetic operation using navigation data and time information obtained in a signal processing circuit (not shown) and finds position, and position information displaying section 103 displays the position information calculated at positioning section 102.

Next, code correlation characteristics will be described.

Figure 3:
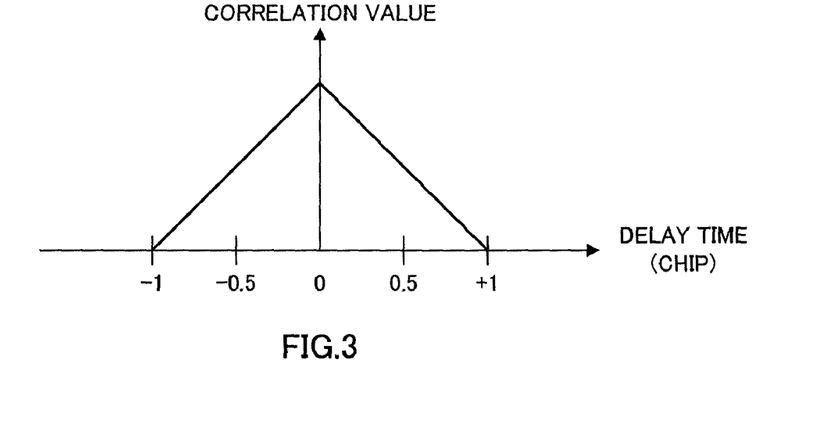
FIG. 3 shows code correlation characteristics of the positioning apparatus according to the present embodiment.

FIG. 3 shows code correlation characteristics. FIG. 3 shows code correlation characteristics due to the difference between spreading code timings inputted to signal processing sections 121 and 122 and a pseudo noise code timing generated by positioning apparatus 100, using L1C/A code as an example. The horizontal axis of FIG. 3 shows the difference between spreading code timings inputted to signal processing sections 121 and 122 and the pseudo noise code timing generated by positioning apparatus 100, and the vertical axis shows the result of code correlation characteristics. Although, the pseudo noise code shows high correlation characteristics if the difference between the spreading code timings and the pseudo noise code timing for carrying out correlation arithmetic operation is zero, the correlation value decreases depending on the difference between these timings if these timings shift, and the correlation value is almost zero if the difference between these timings is one chip of greater.

To determine the pseudo noise code timing where correlation is maximum, a general positioning apparatus obtains two correlation values at a spreading code timing earlier than the pseudo noise code timing and at a spreading code timing later than the pseudo noise code timing, and controls the pseudo noise code timing to a timing where the two correlation values are equal values, so that the pseudo noise code timing generated by the positioning apparatus is adjusted and the pseudo noise code timing where correlation is maximum is detected.

By the way, it is necessary to scan and capture a satellite signal as a preparation before tracking the satellite signal. To scan the satellite signal, the pseudo noise code timing of the satellite signal and a rough value of the carrier frequency are determined. If the pseudo noise code timing and the carrier frequency almost match, a significant value is determined by a time integration.

If a signal that arrives at a receiving antenna at a scanning stage is weak, the correlation value of the pseudo noise code timing and the regenerated carrier frequency almost match, the signal cannot be distinguished from noise. As a general solution in this case, carrying out time integration by making an integration period longer is known. According to this method, if the integration period is multiplied by N, the N fold sensitivity can be anticipated. However, time required to carry out integration once is multiplied by N in scanning carried out in a signal processing circuit, the effective frequency range in decision is divided by N and $N^2$ fold time is required to scan the same scan range. For this reason, if the reception sensitivity is improved by making an integration period for a signal longer, a method of scanning a plurality of scan ranges at the same time is required, and so the circuit scale becomes larger if the reception sensitivity is improved. For this reason, a circuit scale is selected for the general positioning apparatus according to a required reception sensitivity.

Next, code correlation characteristics upon reception of multipath signals will be described.

Receiving multipath signals refers to receiving the direct wave and multipath waves at the same time at antenna section 101.

Figure 4:
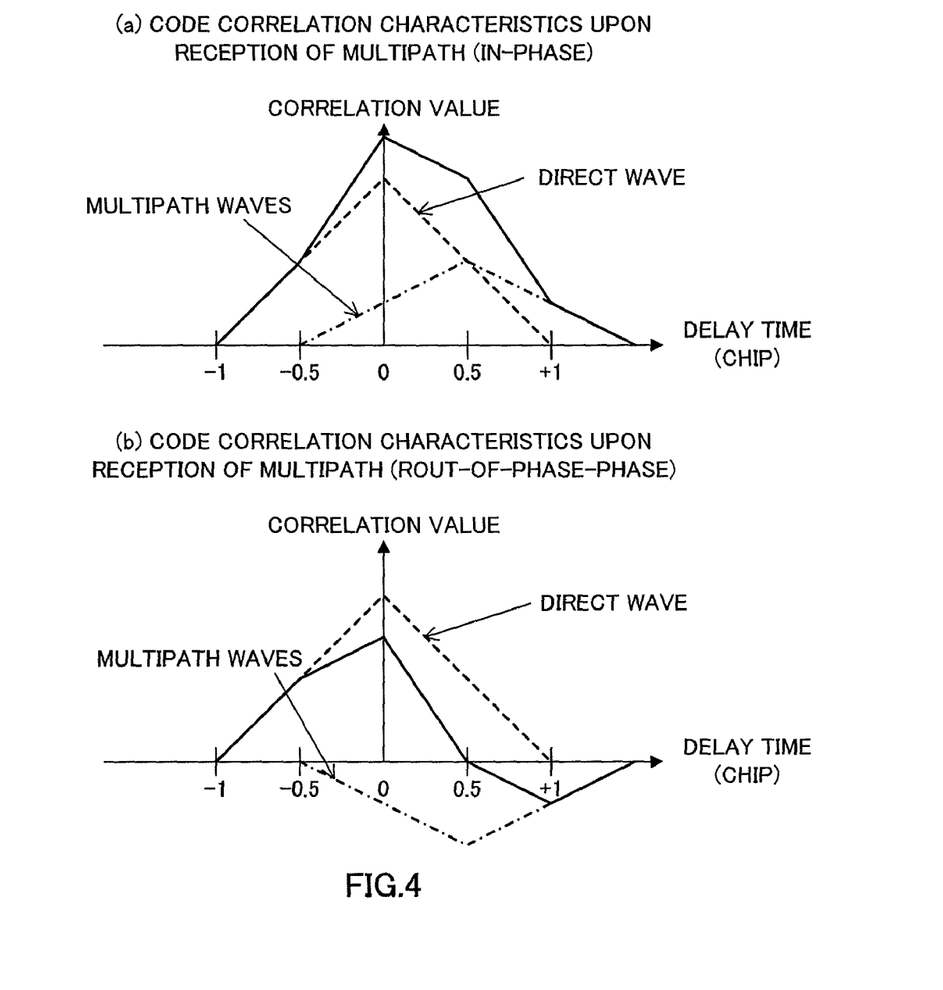
FIG. 4 shows code correlation characteristics of the positioning apparatus upon reception of multipath signals according to the present embodiment.

FIG. 4 shows code correlation characteristics upon reception of multipath signals. The horizontal axis and the vertical axis are the same as in FIG. 3. FIG. 4(a) shows that a multipath signal delayed by 0.5 chip is superposed in-phase upon the direct wave signal of FIG. 3 and FIG. 4(b) shows an out-of-phase superposition.

"In-phase" means that the carrier phase difference between the direct wave and multipath waves is between 0 degree and 90 degrees and refers to relationships where the direct wave and multipath waves enhance one another. Further, "out-of-phase" means that the carrier phase difference is between 90 degrees and 180 degrees and refers to relationships where the direct wave and multipath waves weaken one another.

If multipath waves are received, correlation characteristics are distorted as shown in FIG. 4. For this reason, as described in FIG. 3, to determine the pseudo noise code timing where correlation is maximum, an error occurs at the pseudo noise code timing in a general positioning apparatus, which, as a result, deteriorates the accuracy in positioning. Here, the general positioning apparatus obtains two correlation values at a spreading code timing earlier than the pseudo noise code timing and at a spreading code timing later than the pseudo noise code timing, controls a pseudo noise code timing to a timing where the two correlation values are the same values, adjusts the pseudo noise code timing and detects the pseudo noise code timing where correlation is maximum.

Further, it is known that the carrier phase difference changes following time because the direct wave and multipath waves are transmitted through different routes from the satellite to the positioning apparatus and the positions of the satellite and the positioning apparatus move over time. Therefore, the carrier phase difference between the direct wave and multipath waves changes over time. If there are multipath waves, even in case where correlation characteristics based only on the direct wave do not change over time, a code correlation value obtained at the signal processing section, that is, electric field intensity characteristics, changes over time due to the influence of multipath waves.

With the present embodiment, if the electric field intensity difference between the first signal and the second signal is different from the electric field intensity difference stored in electric field intensity storing section 132 due to multipath cancellation control described later in FIG. 6, it is decided that multipath waves are received from a satellite and this satellite is dropped from the target of positioning arithmetic operation, so that it is possible to prevent deterioration of the accuracy in positioning due to multipath.

Next, controlling section 104 that controls first signal processing section 121 and second signal processing section 122 will be described in detail.

Figure 5:
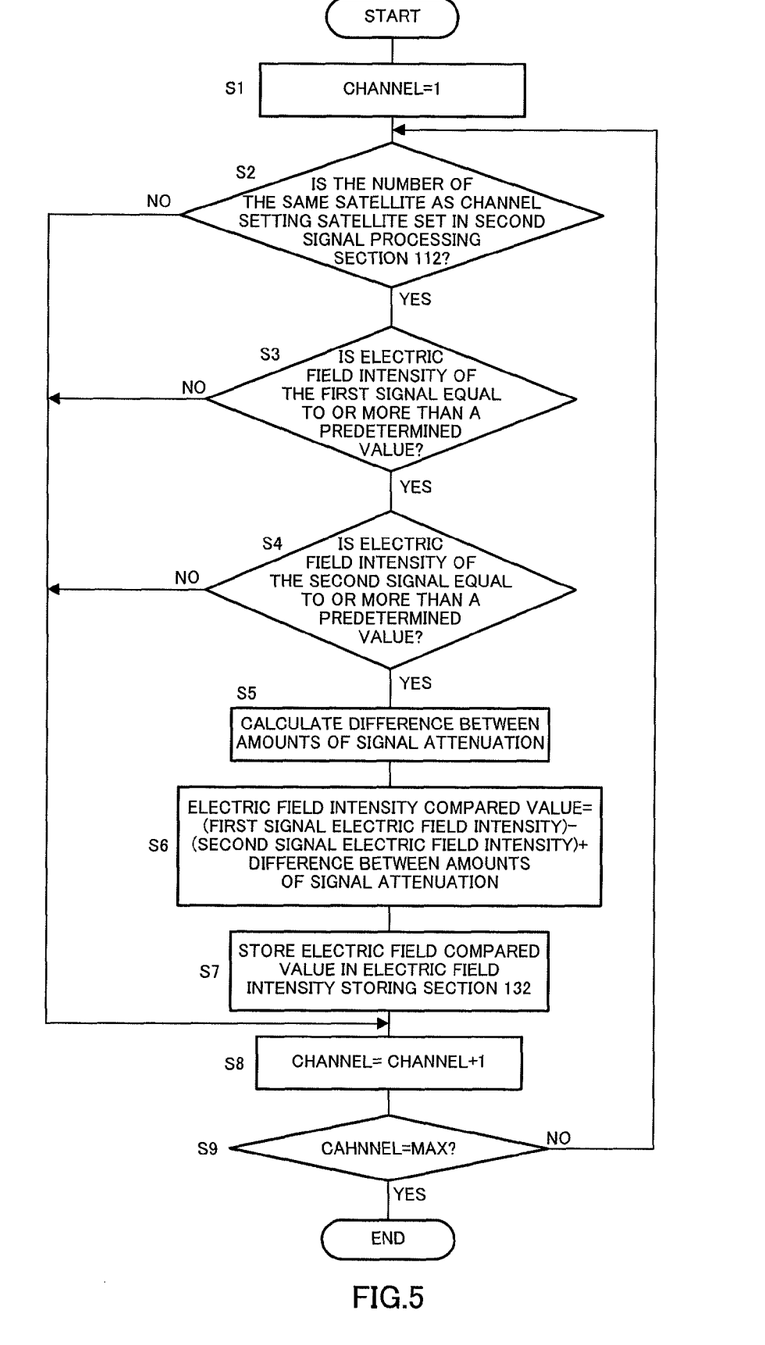
FIG. 5 is a flowchart showing processing in an electric field intensity storing section of a controlling section of the positioning apparatus according to the present embodiment.

FIG. 5 is a flowchart showing processing in electric field intensity storing section 132 of controlling section 104 for carrying out above (2) default value control. In this figure, S refers to each step in the flow.

In step S1, the satellite of the number set in channel CH1 in first signal processing section 121 is made the satellite of the storage target.

In step S2, whether or not the satellite number of the same satellite as the satellite of the storage target is set in one of channels in second signal processing section 122 is decided. If the satellite number of the same satellite as the satellite of the storage target is set in one of the channels in second signal processing section 122, it is decided that the satellite number of the same satellite as the satellite of the storage target is set in second signal processing section 122, and, in step S3, whether or not the electric field intensity of the first signal is equal to or more than a predetermined value is decided. If the electric field intensity of the first signal is equal to or more than a predetermined value, in step S4, whether or not the electric field intensity of the second signal is equal to or more than a predetermined value is decided. If the first signal is the L1 signal, the above second signal has a different frequency band or spreading scheme from the first signal (the L1 signal), and is, for example, the L2 signal or the L5 signal.

In above step S3 and step S4, if the electric field intensity of the signal from the satellite of the storage target is equal to or more than a predetermined value in first signal processing section 121 and second signal processing section 122 and the satellite of the storage target can be tracked stably, in step S5, the difference between the amounts of signal attenuation of the first signal and the second signal in radio wave transmission, is calculated. This difference between the amounts of signal attenuation will be calculated for the following reasons. The electric field intensity difference between the first signal and the second signal can be obtained by finding the difference between the code correlation values, that is, by finding the difference between the electric field intensity values of the two. Here, although satellite transmission power for the first signal (for example, the L1 signal) and for the second signal (for example, the L2 signal) are specified values, the ratios of signal attenuation in radio wave transmission to positioning apparatus 100 are likely to be different for a reason that carrier frequencies are different, etc. Then, with the present embodiment, to cancel the influence by radio wave transmission, the difference between the amounts of signal attenuation of the first signal and the second signal in radio wave transmission is calculated. Here, the amounts of signal attenuation in signal transmission can be calculated based on the carrier frequency and the apparent range from positioning apparatus 100 to the satellite and can be calculated according to following equation 1.

$$PR = (1/4\pi f d^2) \cdot PS \quad \text{(Equation 1)}$$

PR: Received power of the signal arriving at antenna 1
f: The carrier frequency of a radio wave
d: The apparent range from the positioning apparatus to the satellite
PS: Satellite transmission power In step S6, a comparison value of the electric field intensity is calculated by subtracting the electric field intensity of the second signal from the electric field intensity of the first signal and adding the difference between the amounts of signal attenuation of the first signal and the second signal, to the subtraction result.

In step S7, the calculated comparison value of the electric field intensity is stored in electric field intensity storing section 132.

If the satellite number of the same satellite as the satellite of the storage target is not set in one of channels in second signal processing section 122 in above step S2, if the electric field intensity of the first signal is not equal to or more than a predetermined value in above step S3, if the electric field intensity of the second signal is not equal to or more than a predetermined value in above step S4, or if the comparison value of the electric field intensity calculated is stored in electric field intensity storing section 132 in above step S7, channel CH is incremented by one in step S8 and whether or not last channel CH is arrived at (that is, channel=MAX ?) is decided in step S9. If last channel CH is not arrived at, the flow returns to above step S2 and repeats the above processing with respect to all channels, and, if last channel CH is arrived at, it is decided that the processing is finished with respect to all channels and this flow is finished.

In this way, the electric field intensity difference between the first signal and the second signal transmitted from the same satellite is checked on a regular basis, and, if the electric field intensities of the first signal and the second signal transmitted from the same satellite are equal to or more than a predetermined value, the electric field intensity difference is stored. The power differences between L1, L2 and L5 are calculated on a regular basis, and, if these differences change, it is not necessary to change the specifications of the apparatus by carrying out default value control to change the default values of the relative differences between transmission power of L1, L2 and L5 even if the satellite or generation changes. Consequently, improvement in product longevity and cost reduction are anticipated.

Figure 6:
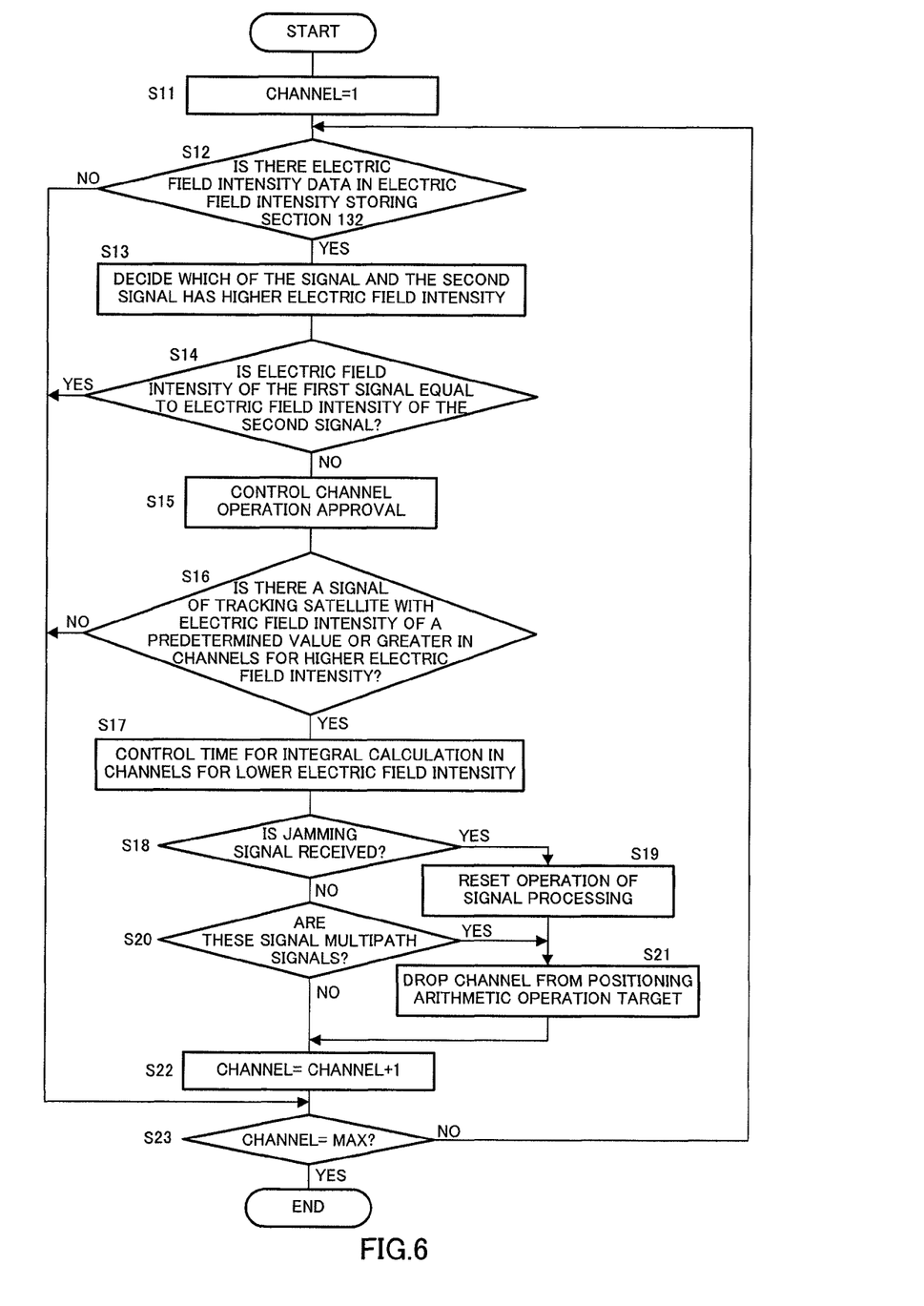
FIG. 6 is a flowchart showing processing in a channel operation controlling section of the controlling section of the positioning apparatus according to the present embodiment.

FIG. 6 is a flowchart showing processing in channel operation controlling section 133 of controlling section 104 for executing above (1) power consumption reduction control, (4) multipath cancellation control and (5) jamming signal cancellation control. Channel operation controlling section 133 controls operations of the channels in first signal processing section 121 and second signal processing section 122.

In step S11, electric field intensity storing section 132 makes the satellite of the number set in channel CH1 in first signal processing section 121 the satellite of the storage target.

In step S12, whether or not electric field intensity data is stored in electric field intensity storing section 132 is decided. If electric field intensity data is stored in electric field intensity storing section 132, in step S13, which of the first signal and the second signal has the higher electric field intensity is decided. If the first signal is the L5 signal, the above second signal has a different frequency band or spreading scheme from the first signal (the L5 signal), and is, for example, the L1 signal or the L2 signal.

In step S14, whether or not the electric field intensities of the first signal and the second signal are equal, is decided. A case will be described below as an example where the electric field intensity of the first signal is higher than the electric field intensity of the second signal.

If the electric field intensities of the first signal and the second signal are not equal, in step S15, channel operation approval control is carried out. Channel operation approval control is directed to carrying out decision of operation approval on each channel in second signal processing section 122 for the signal of the lower electric field intensity, to decide whether or not to continue signal processing operation in channels using received conditions of signals in the channels in first signal processing section 121 As described above, transmission power intensity varies between of L1, L2 and L5. Here, which of the first signal (for example, L5 signal) and the second signal (for example, L1 signal) has the higher electric field intensity is decided, and, if the electric field intensity of the first signal (the L5 signal) is lower than a known predetermined value matching a correlation value of the electric field intensity of the second signal (L1 signal), the second signal (the L1 signal) cannot be received. In this case, clock supply for second signal processing section 122 is stopped according to the channel operation approval control in step S15, second signal processing section 122 that cannot receive the second signal (the L1 signal) is stopped, and power consumption is reduced. If the electric field intensity of the first signal is equal to or more than a predetermined value, second signal processing section 122 is kept operating, and positioning is carried out using the two frequencies for the first signal (the L5 signal) and the second signal (the L1 signal) The explanation given above focuses upon an example where the second signal is the L1 signal, and similarly applies to the L2 signal.

In step S16, whether there is a signal of a tracking satellite of the electric field intensity of a predetermined value or greater in the channels for the higher electric field intensity is decided. If there is a signal of a tracking satellite of the electric field intensity of a predetermined value or greater in the channels for the higher electric field intensity, in step S17, an integration period in the channels for the lower electric field intensity is controlled. The value of the electric field intensity in the channels for the lower electric field intensity can be estimated by subtracting the electric field intensity difference from the value of the electric field intensity in signal synchronization in the channels for the higher electric field intensity. Control is carried out so that, if the estimated value of the electric field intensity is low in the channels for the lower electric field intensity, a signal integration period is increased and the probability of capturing signals is increased, and, if the above value of the electric field intensity is high, the signal integration period is made shorter, the frequency range for scanning at the same time is made wider, and the time spent to capture signals is made shorter.

In step S18, whether or not a jamming signal is received is decided, and, if the jamming signal is received, in step S19, the signal processing operation is reset and the right signal, which is not a jamming signal, is scanned. The jamming signal refers to a signal that causes signals other than the right satellite signal to be detected erroneously. Characteristics of a pseudo noise code used in spectrum spreading is that, as described above, correlation is significant if a spreading code timing and a pseudo noise code timing match and correlation is almost zero if these timings do not match. Further, different pseudo noise codes are used per satellite, and, if different pseudo noise codes are used to distinguish one satellite from other satellites, characteristics of a pseudo noise code produce almost zero correlation value (cross correlation characteristics) at any timing. The cross correlation characteristics have a very small value, but this value is not zero and is about 20 dB with C/A code of the GPS and about 40 dB with L2C code. For this reason, when two satellite signals are received, if the electric field intensity difference between the two signals is greater than cross correlation characteristics of a pseudo noise code, the influence is likely to cause an error in signal processing for the lower electric field intensity due to the influence of the signal for the higher electric field intensity. For this reason, one of the first signal and second signal is received to prevent deterioration of the accuracy in positioning using a jamming signal in positioning arithmetic operation and nevertheless the other is not captured for a long time due to the cross correlation characteristics between the first signal and the second signal, it is possible to decide that a jamming signal of one of signals is received or scanned. If a jamming signal is not received in above step S18, the flow proceeds to step S20.

In step S20, whether or not multipath waves are received is decided, and, if multipath waves are received, in step S21, time information of this channel is dropped from the target of positioning arithmetic operation, and the flow proceeds to step S22.

If multipath waves are not received in above step S20 or if time information of the channel is dropped from the target of positioning arithmetic operation in above step S21, channel CH is incremented by one in step S22 and the flow proceeds to step S23.

If electric field intensity data is not stored in electric field intensity storing section 132 in above step S12, if the electric field intensities of the first signal and the second signal are equal in above step S14, if there is not a tracking satellite of the electric field intensity of a predetermined value or greater in the channels for the higher electric field intensity in above step S16, or if channel CH is incremented in above step S22, whether or not last channel CH is arrived at (that is, channel=MAX?) is decided in step S23. If last channel CH is not arrived at, the flow returns to above step S12 and repeats the above processing with respect to all channels, and, if last channel CH is arrived at, it is decided that processing is finished with respect to all channels, and this flow is finished.

In this way, positioning apparatus 100 according to the present embodiment decides which of the first signal (the L5 signal) and the second signal (the L1 signal) has the higher electric field intensity, and, if the received power of the first signal (the L5 signal) is less than a predetermined value, stops clock supply to second signal processing section 122, so that it is possible to reduce power consumption in second signal processing section 122.

Further, with the present embodiment, if the electric field intensity difference between the first signal and the second signal is different from the electric field intensity difference stored in electric field intensity storing section 132, it is decided that multipath waves are received from a satellite and this satellite is dropped from the target of positioning arithmetic operation, so that it is possible to prevent deterioration of accuracy of positioning due to multipath.

Here, different carrier frequencies are used for the first signal and the second signal, and so the wavelengths of the carrier frequencies are different, and are about 19 cm for L1 (1.575 GHz) and about 22 cm for L2 (1.227 GHz). For this reason, changes in correlation characteristics due to multipath, which occur following a move of a satellite or a positioning apparatus, are different depending on the wavelengths of the carrier frequencies. For this reason, if the electric field intensity difference between the first signal and the second signal obtained in electric field intensity comparing section 131 is different from the electric field intensity difference stored in electric field intensity storing section 132, channel operation controlling section 133 is able to decide that multipath waves are received from a satellite, so that it is possible to prevent deterioration of accuracy in positioning due to multipath by dropping this satellite from the target of positioning arithmetic operation.

Figure 7:
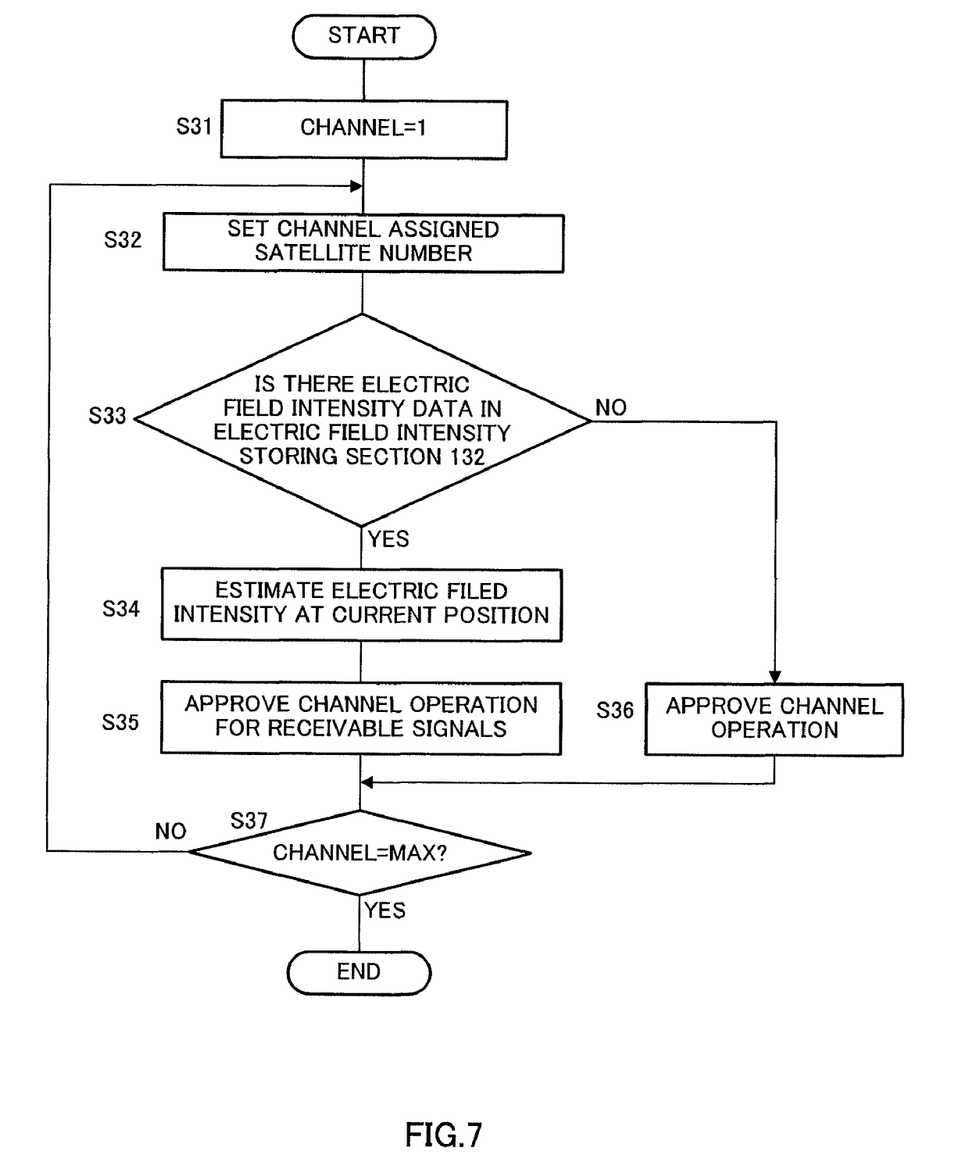
FIG. 7 is a flowchart showing processing in the channel operation controlling section of the controlling section of the positioning apparatus according to the present embodiment.

FIG. 7 is a flowchart showing processing in channel operation controlling section 133 of controlling section 104 for executing above (3) position correction control. This flow can be executed as a subroutine of processing of calculating the amounts of signal attenuation in step S5 in FIG. 5.

In step S31, electric field intensity storing section 132 makes the satellite of the number set in channel CH1 of first signal processing 121 the satellite of the storage target.

In step S32, a channel assigned satellite number is set.

In step S33, whether or not electric field intensity data is stored in electric field intensity storing section 132 is decided. If the electric field intensity data is stored in electric field intensity storing section 132, in step S34, the electric field intensity at the current position is estimated.

In step S35, channel operation with respect to receivable signals is approved, and the flow proceeds to step S37.

If the electric field intensity data is not stored in electric field intensity storing section 132 in above step S33, in step S36, channel operation is approved without estimating the electric field intensity at the current position, and the flow proceeds to step S37. In step S37, whether or not last channel CH is arrived at (i.e. channel=MAX?) is decided. If last channel CH is not arrived at, the flow returns to above step S32 and repeats the above processing with respect to all channels, and, if last channel CH is arrived at, it is decided that the processing is finished with respect to all channels and this flow is finished.

By executing position correction control of this flow, the amount of power attenuation according to the distance between the satellite and the receiver and the accurate correlation differences between L1, L2 and L5 can be obtained, so that it is possible to improve the accuracy of default value control in FIG. 5.

As described above in detail, according to the present embodiment, positioning apparatus 100 has first signal processing section 121 that carries out demodulation processing on the first signal transmitted from the satellite and second signal processing section 122 that carries out demodulation processing on the second signal of a different frequency band or spreading scheme from the first signal, and controlling section 104 controls the operations for the signal of the lower electric field intensity based on the operation for the signal of the higher electric field intensity between first signal processing section 121 and second signal processing section 122, and carries out control to preferentially operate the channels for the signal of the higher electric field intensity between first signal processing section 121 and second signal processing section 122 and to preferentially stop operating the channels for the signal of the lower electric field intensity, so that it is possible to efficiently receive useful signals without special circuitry. By this means, it is possible to obtain an accurate positioning result and reduce power consumption by stopping the operations of the channels receiving signals of the poor received condition.

The above description is an illustration of a preferable embodiment of the present invention and the scope of the present invention is not limited to this.

For example, although the above embodiment provides two of first signal processing section 121 and second signal processing section 122, three or more signal processing sections may be provided. Further, if spreading coding rates are the same as in the L1 band and the L2 band, it is easy to share a signal processing circuit and so only one signal processing section that processes both signals of the L1 band and the L2 band may be provided.

Further, although the name "positioning apparatus" is used in the present embodiment for ease of description, this name may be "receiving apparatus for positioning," "positioning system" or "satellite navigation apparatus."

Further, circuit sections forming the above positioning apparatus, for example, types, the number and connection method of down converter sections and types of electric field intensity setting sections, are not limited to the above embodiment.

Further, the above positioning apparatus and positioning apparatus control method are also realized by a program of functioning a control method of this positioning apparatus. This program is stored in a computer readable recoding medium.

As described above, the present invention is able to realize a positioning apparatus that is able to efficiently receive useful signals without special circuitry, and, consequently, obtain an accurate positioning result and reduce power consumption by stopping the operations of channels receiving signals of the poor received condition.

Accordingly, the positioning apparatus and the positioning apparatus control method according to the present invention preferentially operates the channels for the signal of the higher electric field intensity by storing the electric field intensity difference between the first signal and the second signal transmitted from the same satellite and preferentially stops the operation of the channels for the signal of the lower electric field intensity, so that it is possible to efficiently receive useful signals without special circuitry, and, consequently, obtain an accurate positioning result and reduce power consumption by stopping the operation of the channels receiving signals of the poor received condition, and are useful as and in a positioning apparatus such as a navigation apparatus.

Further, in addition to L1 band signals, L2 band signals and L5 band signals of the GPS, the present invention is useful as a positioning apparatus such as a satellite positioning system such as Galileo in Europe that carries out modulation by various frequencies or codes. For example, the present invention is widely applied to a positioning system that transmits a plurality of satellite signals subjected to spectrum spreading according to a plurality of modulation codes synchronized with the GLONAS of Russia, the WASS of the Untied States of America, the MASA of Japan and the EGNOS of Europe.

What is claimed is:

1. A positioning apparatus with a plurality of channels for scanning or tracking satellite signals, the positioning apparatus comprising:
    a first signal processor that carries out demodulation processing on a first signal transmitted from a satellite;
    a second signal processor that carries out demodulation processing on a second signal of a different frequency band or spreading scheme from the first signal;
    a positioner that calculates a distance from the positioning apparatus to the satellite based on results of the demodulation processings on the first signal and the second signal and carries out a positioning arithmetic operation;
    an electric field intensity comparer that measures an electric field intensity difference between the first signal and the second signal transmitted from the same satellite, based on results of the demodulation processings in the first signal processor and the second signal processor;
    an electric field intensity storage that stores the electric field intensity difference; and
    a controller that controls operations of channels in the first signal processor and channels in the second signal processor, based on electric field intensity information in the electric field intensity storing storage,
    wherein, between the first signal processor and the second signal processor, the controller operates channels for a higher electric field intensity preferentially, and when received power for a signal of the higher electric field intensity is at least equal to a predetermined value, the controller stops an operation of channels for a signal of a lower electric field intensity.

2. The positioning apparatus according to claim 1, wherein, between the first signal processor and the second signal processor, when received power for a signal of the higher electric field intensity is at least equal to a predetermined value, the controller stops the operation of the channels for the signal of the lower electric field intensity.

3. The positioning apparatus according to claim 1, wherein stopping of the operation comprises stopping supplying a clock or turning off electricity.

4. The positioning apparatus according to claim 1, wherein the controller demodulates the first signal and the second signal transmitted from the same satellite and, if one signal is demodulated and the electric field intensity is measured, changes an integration period for the other signal that is not yet demodulated.

5. The positioning apparatus according to claim 1, wherein, if one of the first signal and the second signal transmitted from the same satellite cannot be demodulated even after a certain time passes, the controller determines that a jamming signal is captured in the demodulated signal and resets an operation.

6. The positioning apparatus according to claim 1, wherein the controller determines whether multipath signals are received, based on the electric field intensity difference between the first signal and the second signal transmitted from the same satellite.

7. The positioning apparatus according to claim 1, wherein, if the electric field intensity difference between the first signal and the second signal differs from a value of the electric field intensity storage, the controller carries out control such that the satellite is not used for positioning arithmetic operation.

8. The positioning apparatus according to claim 1, wherein, if the electric field intensity difference between the first signal and the second signal transmitted from the same satellite is at least equal to a predetermined value, the electric field intensity storage stores the electric field intensity difference.

9. The positioning apparatus according to claim 1, further comprising a signal attenuation amount calculator that calculates amounts of signal attenuation in a signal transmission of the first signal and the second signal transmitted from the same satellite, using a distance between the positioning apparatus and the satellite calculated by the positioner, wherein the electric field storage adds the amounts of signal attenuation to the electric field intensity difference obtained by the electric field intensity comparer and stores a result.

10. The positioning apparatus according to claim 1, wherein the satellite signals include at least two of an L1 band signal, an L2 band signal and an L5 band signal transmitted by a global positioning system satellite.

11. A control method of a positioning apparatus with a plurality of channels for scanning or tracking satellite signals, the method comprising;
    carrying out demodulation processing on a first signal transmitted from a satellite;
    carrying out demodulation processing on a second signal of a different frequency band or spreading scheme from the first signal;
    calculating a distance from the positioning apparatus to the satellite based on results of the demodulation processings on the first signal and the second signal and carrying out a positioning arithmetic operation;
    measuring an electric field intensity difference between the first signal and the second signal transmitted from the same satellite, based on the results of the demodulation processings on the first signal and the results of the demodulation processings on the second signal;
    storing the electric field intensity difference; and
    controlling operations of channels in the carrying out demodulation processing on the first signal and channels in the carrying out demodulation processing on the second signal, based on information of the stored electric field intensity difference,
wherein, between carrying out demodulation processing on the first signal and carrying out demodulation processing on the second signal, channels for a signal of a higher electric field intensity are preferentially operated, and when received power for a signal of the higher electric field intensity is at least equal to a predetermined value, the operation of channels for a signal of a lower electric field intensity is stopped.

* * * * *